United States Patent
Minakuchi et al.

(12)

(10) Patent No.: US 10,700,535 B2
(45) Date of Patent: Jun. 30, 2020

(54) CHARGING METHOD AND CHARGING DEVICE INCLUDING MULTIPLE VOLTAGE SOURCES

(71) Applicant: TOYOTA JIDOSHA KABUSHIKI KAISHA, Toyota-shi, Aichi-ken (JP)

(72) Inventors: Akio Minakuchi, Okazaki (JP); Hideto Mori, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/716,979

(22) Filed: Dec. 17, 2019

(65) Prior Publication Data

US 2020/0127471 A1  Apr. 23, 2020

Related U.S. Application Data

(62) Division of application No. 14/975,808, filed on Dec. 20, 2015.

(30) Foreign Application Priority Data

Dec. 25, 2014 (JP) .................................. 2014-262684

(51) Int. Cl.
   *H02J 7/00* (2006.01)
(52) U.S. Cl.
   CPC .................................. *H02J 7/0024* (2013.01)
(58) Field of Classification Search
   CPC .. H02J 7/0021; H02J 7/0024; G01R 31/3696; H01M 2010/4271

USPC ......................................................... 320/117
   See application file for complete search history.

(56) References Cited

U.S. PATENT DOCUMENTS

| | | | |
|---|---|---|---|
| 6,346,794 B1 | 2/2002 | Odaohhara | |
| 2001/0038275 A1* | 11/2001 | Hanada | H02J 7/345 320/118 |
| 2008/0272736 A1 | 11/2008 | Tien et al. | |
| 2011/0127949 A1* | 6/2011 | Taki | H02J 7/0071 320/107 |
| 2013/0229142 A1* | 9/2013 | Teodorescu | E21B 41/0085 320/103 |
| 2013/0300370 A1 | 11/2013 | Hotta | |
| 2014/0306650 A1 | 10/2014 | Akiyoshi et al. | |
| 2015/0190834 A1 | 7/2015 | Clarke et al. | |
| 2016/0105042 A1 | 4/2016 | Taylor et al. | |
| 2017/0201102 A1 | 7/2017 | Hikosaka | |

FOREIGN PATENT DOCUMENTS

| | | |
|---|---|---|
| JP | 2000-324710 A | 11/2000 |
| JP | 2001-178005 A | 6/2001 |
| JP | 2010-063197 A | 3/2010 |
| JP | 2013-219986 A | 10/2013 |

\* cited by examiner

*Primary Examiner* — Nathaniel R Pelton
(74) *Attorney, Agent, or Firm* — Sughrue Mion, PLLC

(57) ABSTRACT

A charging method of a secondary battery having plural cells includes: connecting the plural cells in series and conducting constant current charging by a first power source; measuring voltages of the plural cells; and connecting the plural cells in parallel and conducting constant voltage charging by a second power source, a voltage of which is lower than a voltage of the first power source, in the case where a measured voltage difference among the plural cells is smaller than a specified value.

2 Claims, 13 Drawing Sheets

FIG. 1
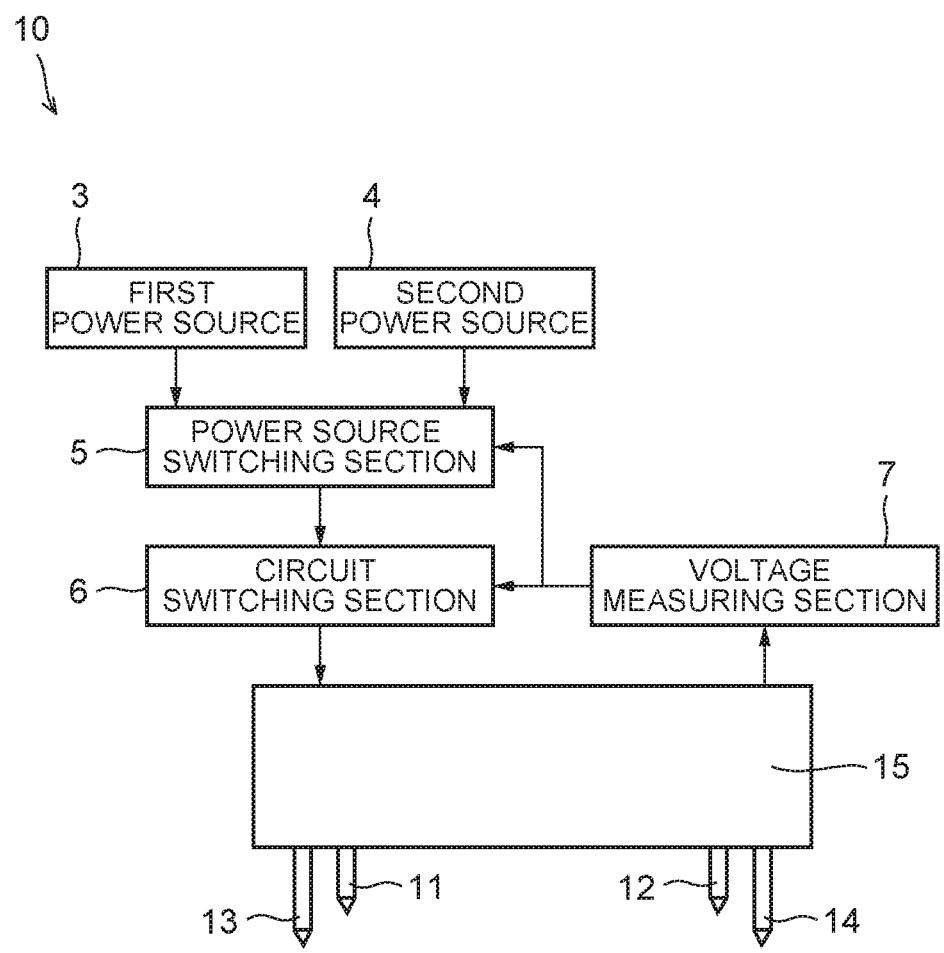
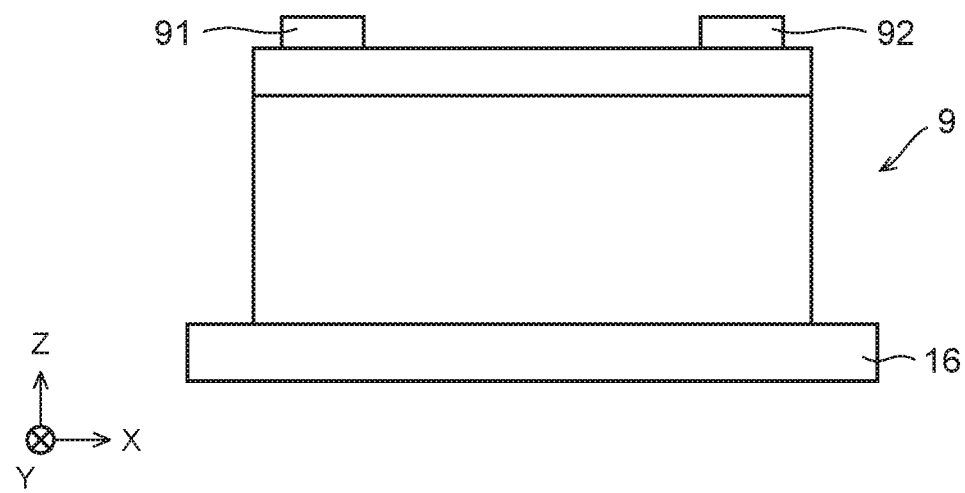

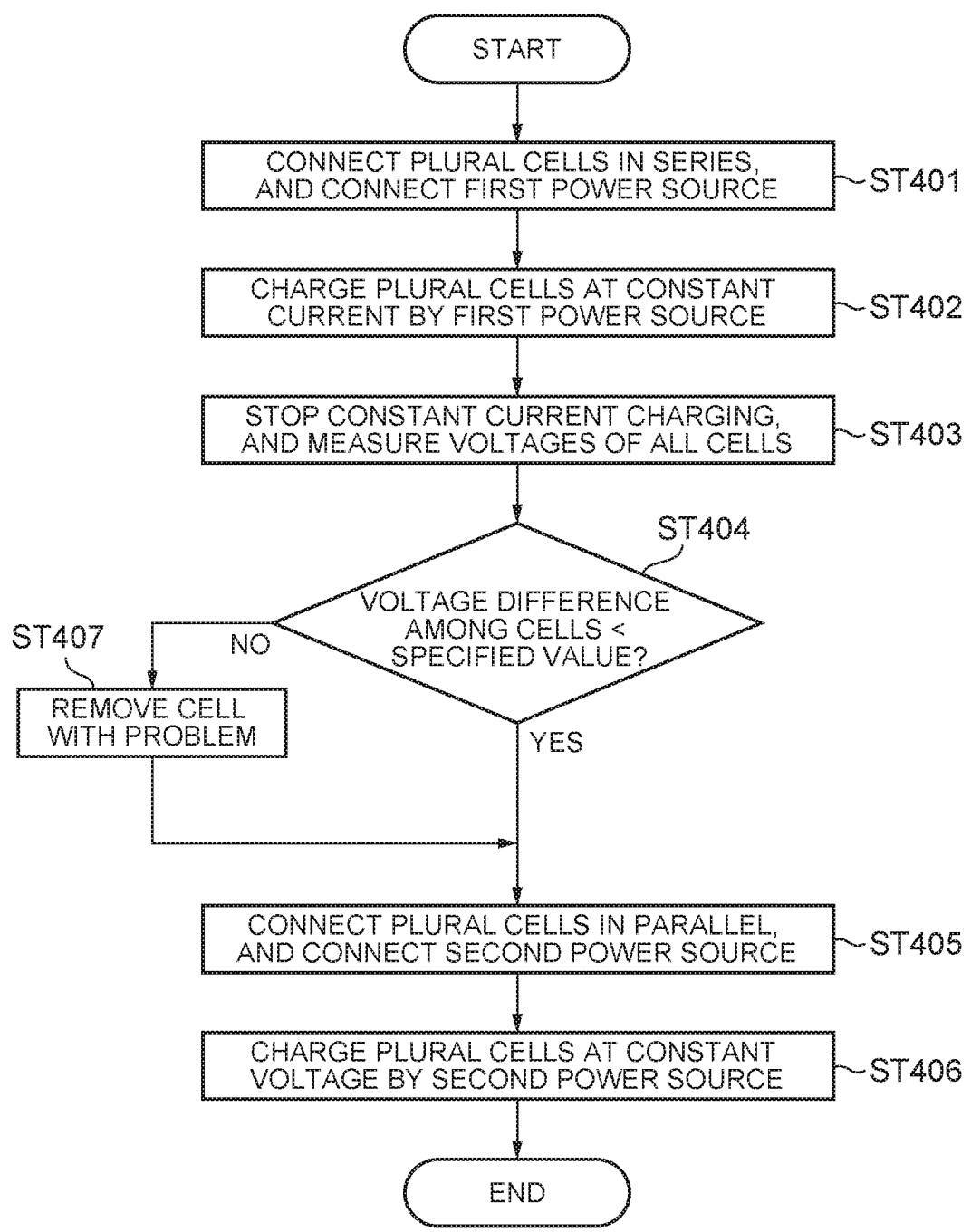

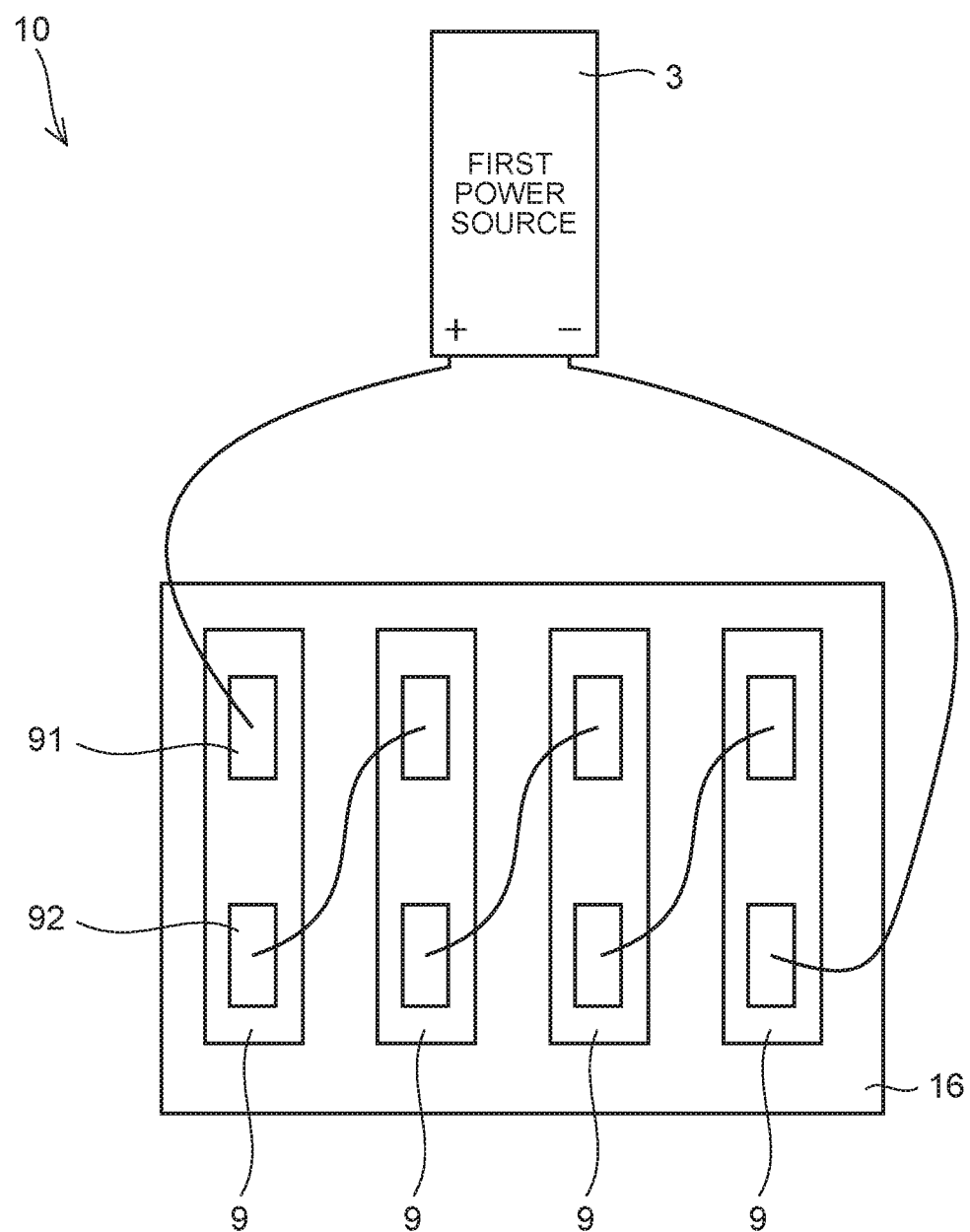

CHARGING METHOD AND CHARGING DEVICE INCLUDING MULTIPLE VOLTAGE SOURCES

INCORPORATION BY REFERENCE

This application is a Divisional Application of U.S. application Ser. No. 14/975,808 filed Dec. 20, 2015, claiming priority based on Japanese Patent Application No. 2014-262684 filed on Dec. 25, 2014, the disclosures of which are incorporated herein by reference in their entireties.

BACKGROUND OF THE INVENTION

1. Field of the Invention

The invention relates to a charging method and a charging device.

2. Description of Related Art

As a charging method of a secondary battery, for example, a charging method described in Japanese Patent Application Publication No. 2010-63197 (JP 2010-63197 A) has been known. In the charging method described in JP 2010-63197 A, plural cells are connected to one power source and can be switched between a serial connection and a parallel connection by plural switches. In the charging method described in JP 2010-63197 A, the plural cells are connected in series and are subjected to serial constant current charging with a high voltage. Then, the plural cells are connected in parallel and are subjected to parallel constant voltage charging, in which a power source voltage is reduced to be lower than that in the serial constant current charging.

In the charging method described in JP 2010-63197 A, the power source voltage during the parallel constant voltage charging has to be reduced to be lower than the power source voltage during the serial constant current charging. However, since only the one power source is used, such a problem that it is difficult to accurately reduce the power source voltage to a target value during the constant voltage charging occurs. Meanwhile, in a circuit of a charging device described in JP 2010-63197 A, a diode is used as the switch for switching between the serial connection and the parallel connection. Accordingly, such a problem that voltages of the plural cells are not leveled in the parallel connection also occurs.

SUMMARY OF THE INVENTION

The invention provides a charging method and a charging device capable of improving accuracy of a voltage value during constant voltage charging.

A charging method according to a first aspect of the invention is a charging method for charging plural cells, the charging method including: connecting the plural cells in series and conducting constant current charging by a first power source; measuring voltages of the plural cells; and connecting the plural cells in parallel and conducting constant voltage charging by a second power source, a voltage of which is lower than a voltage of the first power source, in the case where a measured voltage difference among the plural cells is smaller than a specified value.

According to the charging method according to the invention, the constant current charging in the serial connection and the constant voltage charging in the parallel connection can be conducted by using the different power sources. In this way, accuracy of a voltage value in the constant voltage charging can be improved.

In the invention, it is preferred that the constant current charging is stopped when at least one of the plural cells or predetermined number of the cells reach a specified voltage.

According to the charging method according to the invention, it is possible to prevent the voltage of the cell from becoming excessively higher than a desired value.

In the invention, the charging method uses a charging device that includes: a conductive pin that is connected to a terminal of each of the plural cells and supplies electric power to each of the plural cells; and a voltage measuring pin that is connected to the terminal and measures the voltage of each of the plural cells and, in which the voltage measuring pin comes in contact with the terminal ahead of the conductive pin. In conducting the constant current charging or in conducting the constant voltage charging, when the plural cells are connected to the first power source or the second power source, the voltage measuring pin is brought into contact with the terminal so as to measure the voltage of each of the plural cells. In the case where the measured voltage does not fall within a specified range, it is preferred to prohibit contact between each of the plural cells and the conductive pin.

According to the charging method according to the invention, the voltage measuring pin comes in contact with the terminal ahead of the conductive pin and measures the voltage of each of the plural cells. In the case where a measurement result is abnormal, contact of the conductive pin is prohibited. In this way, contact of the conductive pin with the terminal can be prohibited when the voltage measuring pin is not in proper contact with the terminal. Thus, occurrence of a short circuit, which is caused by contact of the conductive pin with a portion other than the terminal, can be prevented.

In the invention, the charging method uses a charging device that includes: a conductive pin that is connected to a terminal of each of the plural cells and supplies electric power to each of the plural cells; and a voltage measuring pin that is connected to the terminal and measures the voltage of each of the plural cells and, in which the voltage measuring pin is detached from the terminal ahead of the conductive pin when the voltage measuring pin and the conductive pin are displaced in a direction along a terminal surface on which the terminal is arranged. In conducting the constant current charging or in conducting the constant voltage charging, the voltages of the plural cells are measured. In the case where the measured voltage does not fall within a specified range, it is preferred to cancel connection between the plural cells and the first power source or the second power source.

In the charging method according to the invention, the voltage measuring pin is detached from the terminal ahead of the conductive pin when the voltage measuring pin is displaced with respect to the cell. In this way, when energization is stopped at a time point the voltage can no longer be measured, occurrence of a short circuit, which is caused by contact of the conductive pin with a portion other than the terminal, can be prevented.

A charging device according to a second aspect of the invention is a charging device for charging plural cells, the charging device including: a first power source; a second power source, a voltage of which is lower than that of the first power source; and a voltage measuring section for measuring voltages of the plural cells, in which the plural cells are connected in series and are subjected to constant current charging by the first power source, and the plural cells are connected in parallel and are subjected to constant voltage charging by the second power source in the case where a voltage difference among the plural cells after the constant current charging is smaller than a specified value.

According to the charging device according to the invention, the constant current charging in the serial connection and the constant voltage charging in the parallel connection can be conducted by using the different power sources. In this way, accuracy of a voltage value in the constant voltage charging can be improved.

In the invention, it is preferred to stop the constant current charging when at least one of the plural cells or predetermined number of the cells reach a specified voltage.

According to the charging device according to the invention, it is possible to prevent the voltage of the cell from becoming excessively higher than a desired value.

A charging device according to a third aspect of the invention includes: a positive electrode terminal conductive pin that is connected to a positive electrode terminal of a cell and supplies electric power to the cell; a positive electrode terminal voltage measuring pin that is connected to the positive electrode terminal of the cell and measures a voltage of the cell; a negative electrode terminal conductive pin that is connected to a negative electrode terminal of the cell, is paired with the positive electrode terminal conductive pin, and supplies the electric power to the cell; and a negative electrode terminal voltage measuring pin that is connected to the negative electrode terminal of the cell, is paired with the positive electrode terminal voltage measuring pin, and measures the voltage of the cell, in which a tip position of the positive electrode terminal voltage measuring pin is closer to the positive electrode terminal than that of the positive electrode terminal conductive pin, a tip position of negative electrode terminal voltage measuring pin is closer to the negative electrode terminal than that of the negative electrode terminal conductive pin, and tips of the positive electrode terminal voltage measuring pin and the negative electrode terminal voltage measuring pin are retractable when respectively abutting against the positive electrode terminal and the negative electrode terminal.

According to the charging device according to the invention, the positive electrode terminal voltage measuring pin and the negative electrode terminal voltage measuring pin respectively come in contact with the positive electrode terminal and the negative electrode terminal ahead of the positive electrode terminal conductive pin and the negative electrode terminal conductive pin. In this way, the voltage of the cell can be measured before the cell is energized. Accordingly, it can be determined whether the positive electrode terminal conductive pin and the negative electrode terminal conductive pin should be brought into contact with the cell after the voltage difference among the cells is checked.

In the invention, on a terminal surface of the cell, on which the positive electrode terminal and the negative electrode terminal are arranged, it is preferred that the positive electrode terminal conductive pin is positioned in the vicinity of a center of the positive electrode terminal, that the negative electrode terminal conductive pin is positioned in the vicinity of a center of the negative electrode terminal, that the positive electrode terminal voltage measuring pin is positioned on an outer side of the positive electrode terminal conductive pin when seen from a middle point between the positive electrode terminal conductive pin and the negative electrode terminal conductive pin, and that the negative electrode terminal voltage measuring pin is positioned on an outer side of the negative electrode terminal conductive pin when seen from the middle point.

In the charging device according to the invention, the positive electrode terminal voltage measuring pin and the negative electrode terminal voltage measuring pin are respectively detached from the positive electrode terminal and the negative electrode terminal ahead of the positive electrode terminal conductive pin and the negative electrode terminal conductive pin when the pins are displaced with respect to the cell. Accordingly, the energization is stopped at a time point that the voltage can no longer be measured. In this way, short circuits of the positive electrode terminal conductive pin and the negative electrode terminal conductive pin can be prevented.

According to the invention, the charging method and the charging device capable of improving the accuracy of the voltage value during the constant voltage charging can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a front view of a charging device according to Embodiment 1;

FIG. 8 is a flowchart of a charging method according to Embodiment 1;

FIG. 9 is a schematic view of a state where the four cells are connected in series in an example;

DETAILED DESCRIPTION OF EMBODIMENTS

Embodiment 1

A description will hereinafter be made on an embodiment of the invention with reference to the drawings.

Figure 2:
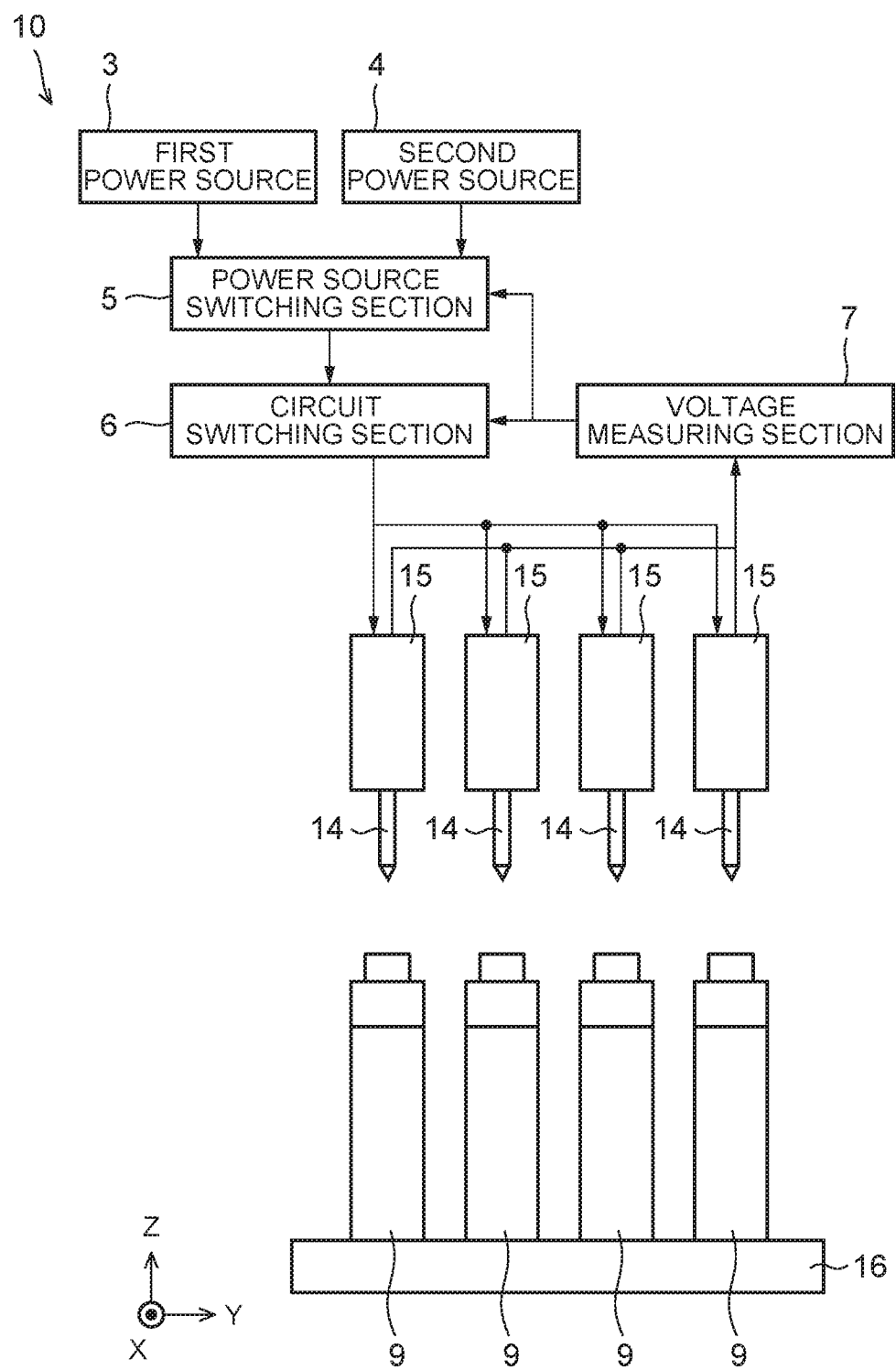
FIG. 2 is a side view of the charging device according to Embodiment 1.

As shown in FIG. 1 and FIG. 2, a charging device 10 has a positive electrode terminal conductive pin 11, a negative electrode terminal conductive pin 12, a positive electrode terminal voltage measuring pin 13, a negative electrode terminal voltage measuring pin 14, a pin holding section 15, a first power source 3, a second power source 4, a power source switching section 5, a circuit switching section 6, and a voltage measuring section 7. A secondary battery cell 9 has a positive electrode terminal 91 and a negative electrode terminal 92. The positive electrode terminal 91 and the negative electrode terminal 92 are arranged on a terminal surface of the cell 9.

The charging device 10 charges the cell 9 by connecting the positive electrode terminal 91 and the negative electrode terminal 92 of the cell 9 to the first power source 3 or the second power source 4 and applying a voltage thereto. The plural cells 9 in an arranged state are fixed to a jig 16, and thus the plural cells 9 can simultaneously be charged.

The positive electrode terminal conductive pin 11 is a pin that is connected to the positive electrode terminal 91 of the cell 9 and supplies electric power to the cell 9. The negative electrode terminal conductive pin 12 is a pin that is connected to the negative electrode terminal 92 of the cell 9, is paired with the positive electrode terminal conductive pin 11, and supplies the electric power to the cell 9.

The positive electrode terminal voltage measuring pin 13 is a pin that is connected to the positive electrode terminal 91 of the cell 9 and measures a voltage of the cell 9. The negative electrode terminal voltage measuring pin 14 is a pin that is connected to the negative electrode terminal 92 of the cell 9, is paired with the positive electrode terminal voltage measuring pin 13, and measures the voltage of the cell 9.

The pin holding section 15 holds the positive electrode terminal conductive pin 11, the negative electrode terminal conductive pin 12, the positive electrode terminal voltage measuring pin 13, and the negative electrode terminal voltage measuring pin 14 on a pin holding surface that opposes the terminal surface of the cell 9. The pin holding section 15 can move in a Z-axis direction. When the pin holding section 15 is moved in a Z-axis negative direction, the positive electrode terminal conductive pin 11, the negative electrode terminal conductive pin 12, the positive electrode terminal voltage measuring pin 13, and the negative electrode terminal voltage measuring pin 14 are brought into contact with the positive electrode terminal 91 and the negative electrode terminal 92.

A tip position of the positive electrode terminal voltage measuring pin 13 is closer to the positive electrode terminal 91 than a tip position of the positive electrode terminal conductive pin 11. A tip position of the negative electrode terminal voltage measuring pin 14 is closer to the negative electrode terminal 92 than a tip position of the negative electrode terminal conductive pin 12. For example, the positive electrode terminal voltage measuring pin 13 and the negative electrode terminal voltage measuring pin 14 may be longer than the positive electrode terminal conductive pin 11 and the negative electrode terminal conductive pin 12. In this way, the positive electrode terminal voltage measuring pin 13 and the negative electrode terminal voltage measuring pin 14 respectively come in contact with the positive electrode terminal 91 and the negative electrode terminal 92 ahead of the positive electrode terminal conductive pin 11 and the negative electrode terminal conductive pin 12.

Tips of the positive electrode terminal voltage measuring pin 13 and the negative electrode terminal voltage measuring pin 14 are retractable when respectively abutting against the positive electrode terminal 91 and the negative electrode terminal 92 of the cell 9. Roots of the positive electrode terminal voltage measuring pin 13 and the negative electrode terminal voltage measuring pin 14 are each supported by a spring. When a force is applied to the tips of the positive electrode terminal voltage measuring pin 13 and the negative electrode terminal voltage measuring pin 14, the springs are compressed. Then, the tips of the positive electrode terminal voltage measuring pin 13 and the negative electrode terminal voltage measuring pin 14 are thereby retracted.

The positive electrode terminal voltage measuring pin 13 and the negative electrode terminal voltage measuring pin 14 respectively come in contact with the positive electrode terminal 91 and the negative electrode terminal 92 ahead of the positive electrode terminal conductive pin 11 and the negative electrode terminal conductive pin 12. In this way, the voltage of the cell 9 can be measured before the cell 9 is energized. Accordingly, it can be determined whether the positive electrode terminal conductive pin 11 and the negative electrode terminal conductive pin 12 should be brought into contact with the cell 9 after a voltage difference among the cells 9 is checked. When the voltage difference among the cells 9 is large, the positive electrode terminal conductive pin 11 and the negative electrode terminal conductive pin 12 are prohibited from contacting the positive electrode terminal 91 and the negative electrode terminal 92, respectively. Thus, a flow of a large current through the cells 9 can be prevented when the cells 9 are connected in parallel.

In the case where a voltage between the positive electrode terminal voltage measuring pin 13 and the negative electrode terminal voltage measuring pin 14, which is measured by the voltage measuring section 7, does not fall within a specified range, it may be determined that the positive electrode terminal voltage measuring pin 13 and the negative electrode terminal voltage measuring pin 14 are not in proper contact with the positive electrode terminal 91 and the negative electrode terminal 92, respectively, and the positive electrode terminal conductive pin 11 and the negative electrode terminal conductive pin 12 may be prohibited from contacting the positive electrode terminal 91 and the negative electrode terminal 92, respectively. Similarly, also in the case where the voltage measuring section 7 cannot measure the voltage between the positive electrode terminal voltage measuring pin 13 and the negative electrode terminal voltage measuring pin 14, the positive electrode terminal conductive pin 11 and the negative electrode terminal conductive pin 12 may be prohibited from contacting the positive electrode terminal 91 and the negative electrode terminal 92, respectively.

Figure 4A:
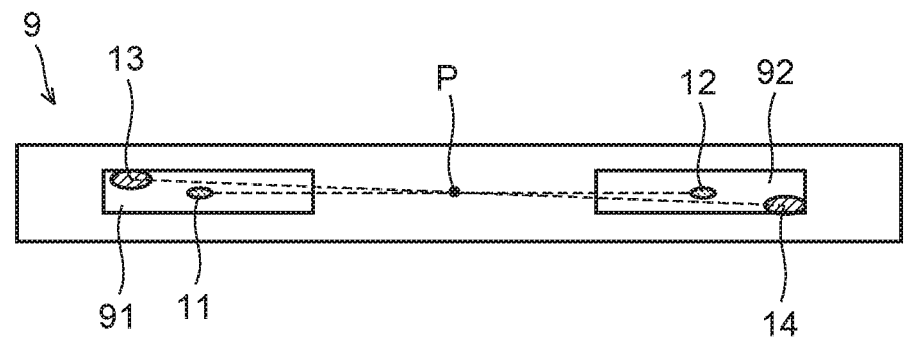
FIG. 4A is a view of a positional relationship between terminals on a terminal surface of a cell and the pins of the charging device.
Figure 4B:
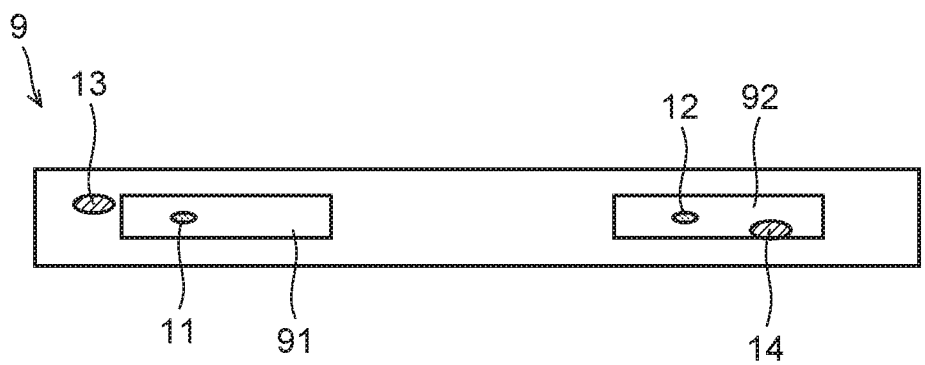
FIG. 4B is a view of a positional relationship between terminals on a terminal surface of a cell and the pins of the charging device.
Figure 4C:
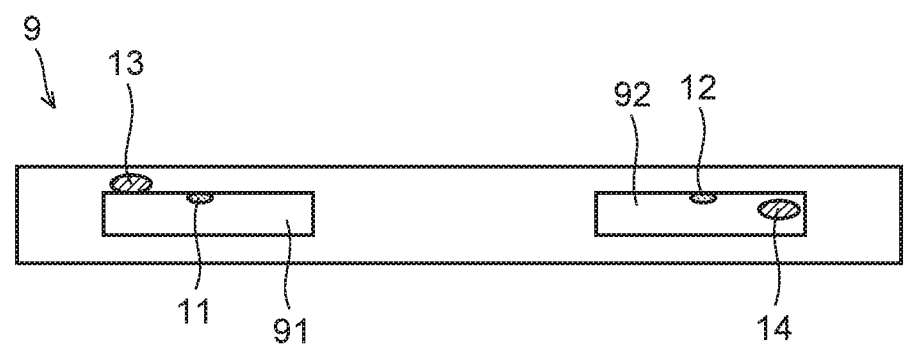
FIG. 4C is a view of a positional relationship between terminals on a terminal surface of a cell and the pins of the charging device.

FIG. 4A to FIG. 4C show positional relationships between each of the positive electrode terminal voltage measuring pin 13, the negative electrode terminal voltage measuring pin 14, the positive electrode terminal conductive pin 11, and the negative electrode terminal conductive pin 12 on the terminal surface of the cell 9 and each of the positive electrode terminal 91 and the negative electrode terminal 92. Here, a surface on which the positive electrode terminal 91 and the negative electrode terminal 92 of the cell 9 are provided is referred to as a terminal surface as a matter of convenience. FIG. 4A shows a state where all the pins are in contact, and FIG. 4B and FIG. 4C show a state of contact failure.

As shown in FIG. 4, a middle point between the positive electrode terminal conductive pin 11 and the negative electrode terminal conductive pin 12 on the terminal surface at a time that the positive electrode terminal conductive pin 11 and the negative electrode terminal conductive pin 12 are respectively brought into contact with the positive electrode terminal 91 and the negative electrode terminal 92 is set as P.

When the positive electrode terminal conductive pin 11 and the negative electrode terminal conductive pin 12 are properly in contact with the positive electrode terminal 91 and the negative electrode terminal 92, respectively, the positive electrode terminal conductive pin 11 is positioned in the vicinity of a center of the positive electrode terminal 91, and the negative electrode terminal conductive pin 12 is positioned in the vicinity of a center of the negative electrode terminal 92. In this way, the positive electrode terminal conductive pin 11 and the negative electrode terminal conductive pin 12 are less likely to be detached from the positive electrode terminal 91 and the negative electrode terminal 92, respectively.

The positive electrode terminal conductive pin 11 is positioned closer to the middle point P than the positive electrode terminal voltage measuring pin 13. The negative electrode terminal conductive pin 12 is positioned closer to the middle point P than the negative electrode terminal voltage measuring pin 14. That is, the positive electrode terminal voltage measuring pin 13 and the negative electrode terminal voltage measuring pin 14 are respectively positioned on outer sides of the positive electrode terminal conductive pin 11 and the negative electrode terminal conductive pin 12 when seen from the middle point P. Accordingly, when the cell 9 rotates with respect to the pin holding section 15 and rotational displacement occurs, the positive electrode terminal voltage measuring pin 13 and the negative electrode terminal voltage measuring pin 14 are respectively detached from the positive electrode terminal 91 and the negative electrode terminal 92 ahead of the positive electrode terminal conductive pin 11 and the negative electrode terminal conductive pin 12.

The positive electrode terminal conductive pin 11 and the negative electrode terminal conductive pin 12 are arranged point-symmetrically about the middle point P between the positive electrode terminal conductive pin 11 and the negative electrode terminal conductive pin 12 on the terminal surface. The positive electrode terminal voltage measuring pin 13 and the negative electrode terminal voltage measuring pin 14 are arranged point-symmetrically about the middle point P between the positive electrode terminal conductive pin 11 and the negative electrode terminal conductive pin 12 on the terminal surface.

Figure 3:
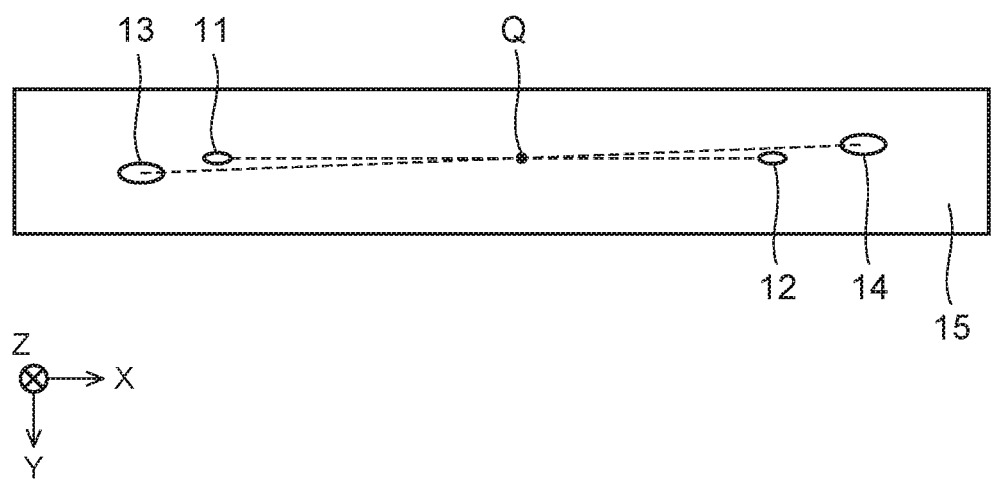
FIG. 3 is a view of arrangement of pins on a pin holding surface of a pin holding section according to Embodiment 1.

FIG. 3 is a view of the pin holding surface of the pin holding section 15. The positive electrode terminal conductive pin 11, the negative electrode terminal conductive pin 12, the positive electrode terminal voltage measuring pin 13, and the negative electrode terminal voltage measuring pin 14 are formed on the pin holding surface of the pin holding section 15. A middle point between the positive electrode terminal conductive pin 11 and the negative electrode terminal conductive pin 12 on the pin holding surface is set as Q.

Similar to the middle point P on the terminal surface, the positive electrode terminal voltage measuring pin 13 and the negative electrode terminal voltage measuring pin 14 are arranged point-symmetrically about the middle point Q on the pin holding surface. The positive electrode terminal conductive pin 11 and the negative electrode terminal conductive pin 12 are arranged point-symmetrically about the middle point Q.

As shown in FIG. 4B, in the case where the pins are displaced to the left (in an X-axis negative direction) with respect to the cell 9, the positive electrode terminal voltage measuring pin 13 is detached from the positive electrode terminal 91 ahead of the positive electrode terminal conductive pin 11. As shown in FIG. 4C, in the case where the pins are displaced to the above (in a Y-axis positive direction) with respect to the cell 9, the positive electrode terminal voltage measuring pin 13 is detached from the positive electrode terminal 91 ahead of the positive electrode terminal conductive pin 11.

Figure 5A:
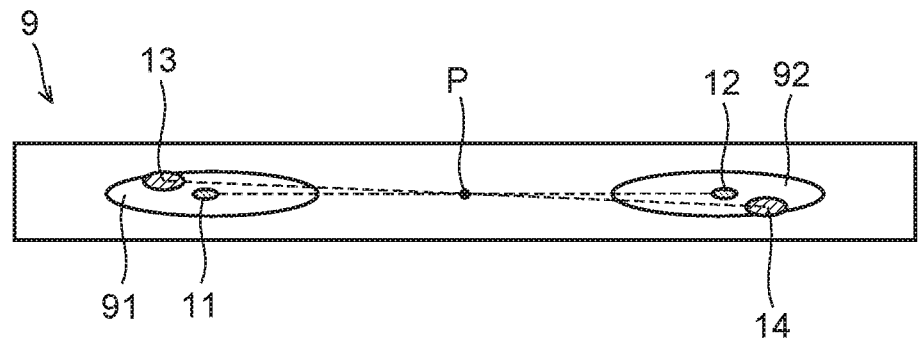
FIG. 5A is a view of a positional relationship between the terminals of the cell and the pins of the charging device in the case where the terminals of the cell are oval.
Figure 5B:
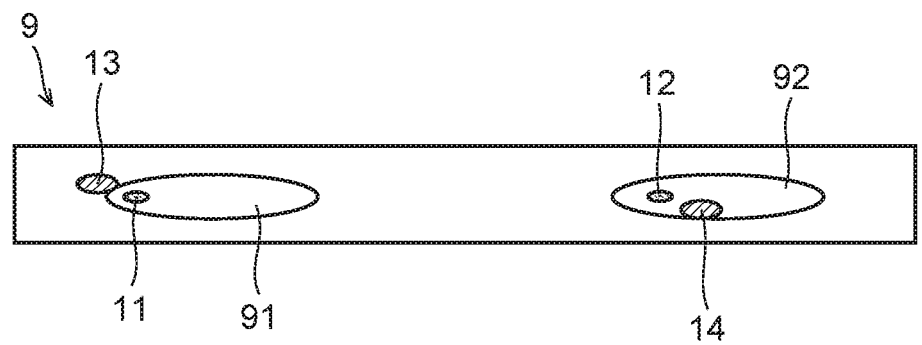
FIG. 5B is a view of a positional relationship between the terminals of the cell and the pins of the charging device in the case where the terminals of the cell are oval.
Figure 5C:
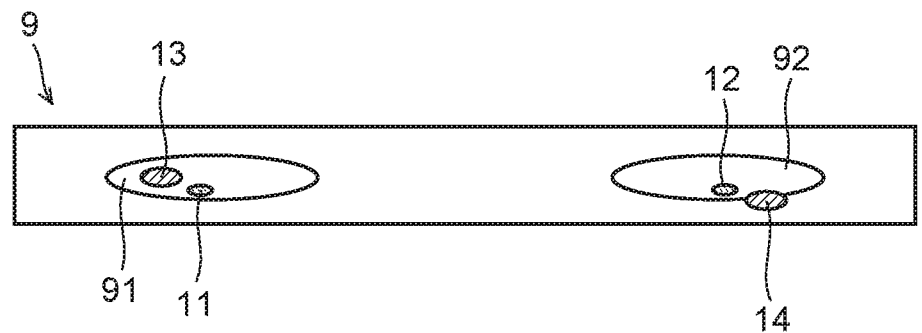
FIG. 5C is a view of a positional relationship between the terminals of the cell and the pins of the charging device in the case where the terminals of the cell are oval.
Figure 6A:
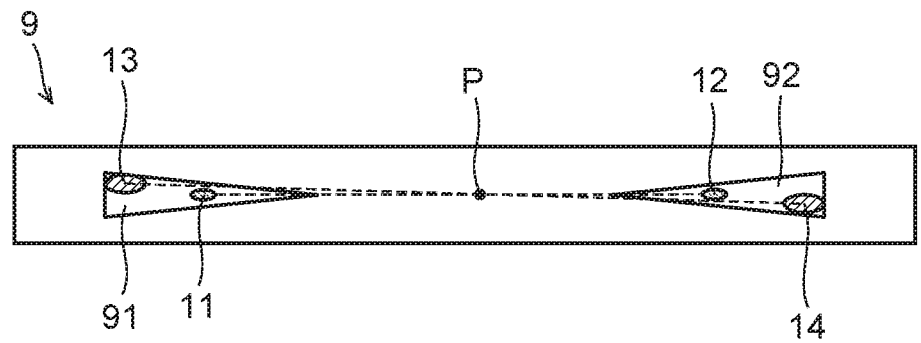
FIG. 6A is a view of a positional relationship between the terminals of the cell and the pins of the charging device in the case where the terminals of the cell are triangle.
Figure 6B:
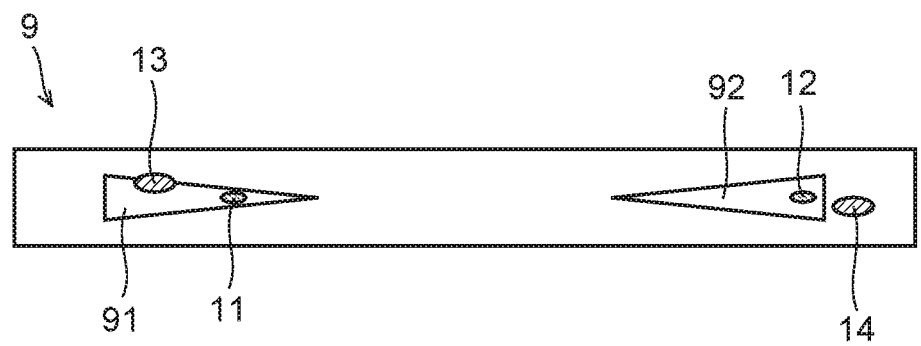
FIG. 6B is a view of a positional relationship between the terminals of the cell and the pins of the charging device in the case where the terminals of the cell are triangle.
Figure 6C:
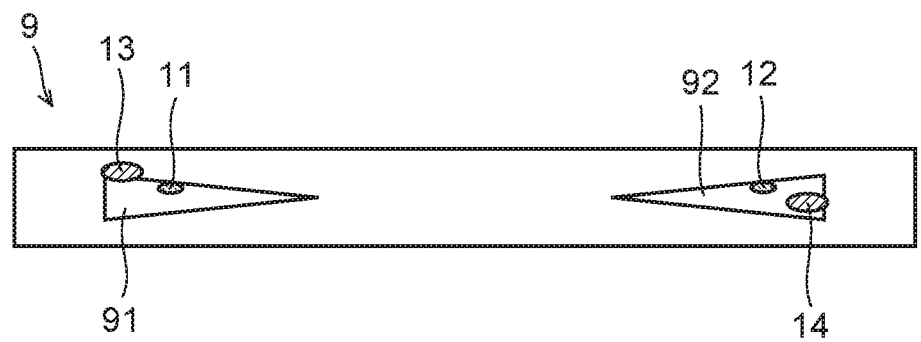
FIG. 6C is a view of a positional relationship between the terminals of the cell and the pins of the charging device in the case where the terminals of the cell are triangle.

FIG. 5A to FIG. 5C and FIG. 6A to FIG. 6C show examples in which shapes of the positive electrode terminal 91 and the negative electrode terminal 92 of the cell 9 differ. FIG. 5A to FIG. 5C are views of an example in which the shapes of the positive electrode terminal 91 and the negative electrode terminal 92 of the cell 9 are ovals. FIG. 6A to FIG. 6C are views of an example in which the shapes of the positive electrode terminal 91 and the negative electrode terminal 92 of the cell 9 are triangles. Even in the case where the shapes of the positive electrode terminal 91 and the negative electrode terminal 92 of the cell 9 are other than rectangles, the positive electrode terminal voltage measuring pin 13 and the negative electrode terminal voltage measuring pin 14 are respectively detached from the positive electrode terminal 91 and the negative electrode terminal 92 ahead of the positive electrode terminal conductive pin 11 and the negative electrode terminal conductive pin 12 when the pins are displaced with respect to the cell 9.

Figure 7A:
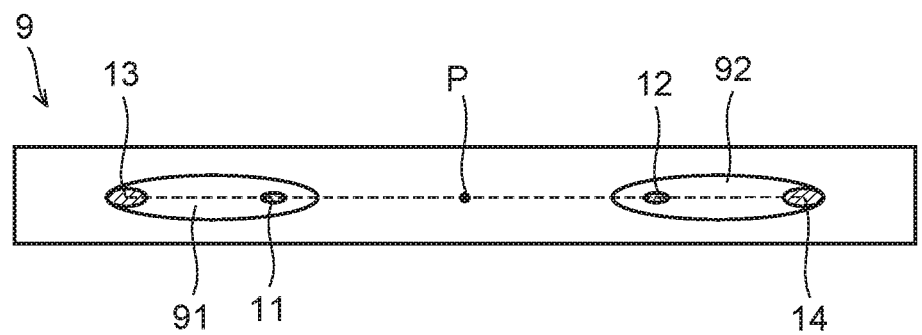
FIG. 7A is a view of a positional relationship between the terminals of the cell and the pins of the charging device in the case where the terminals of the cell are oval and the pins of the charging device are aligned on a straight line.
Figure 7B:
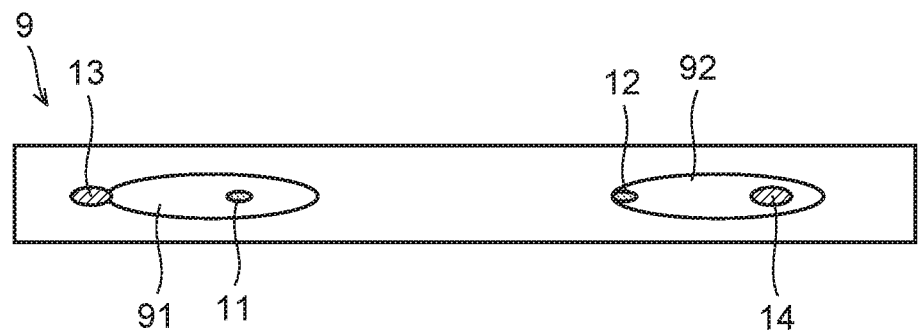
FIG. 7B is a view of a positional relationship between the terminals of the cell and the pins of the charging device in the case where the terminals of the cell are oval and the pins of the charging device are aligned on a straight line.
Figure 7C:
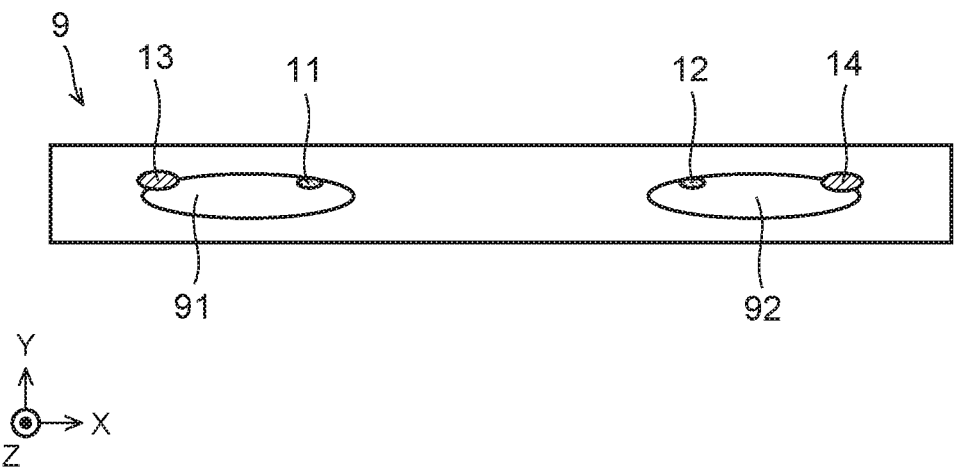
FIG. 7C is a view of a positional relationship between the terminals of the cell and the pins of the charging device in the case where the terminals of the cell are oval and the pins of the charging device are aligned on a straight line.

FIG. 7A to FIG. 7C show a modified example in which the positive electrode terminal voltage measuring pin 13, the negative electrode terminal voltage measuring pin 14, the positive electrode terminal conductive pin 11, and the negative electrode terminal conductive pin 12 are arranged so as to be aligned on a straight line. The case where the positive electrode terminal 91 and the negative electrode terminal 92 of the cell 9 are oval is shown. When the pins are displaced with respect to the cell 9, the positive electrode terminal voltage measuring pin 13 and the negative electrode terminal voltage measuring pin 14 are respectively detached from the positive electrode terminal 91 and the negative electrode terminal 92 ahead of the positive electrode terminal conductive pin 11 and the negative electrode terminal conductive pin 12.

When contact positions of the positive electrode terminal conductive pin 11 and the negative electrode terminal conductive pin 12 with respect to the positive electrode terminal 91 and the negative electrode terminal 92 are displaced, a short circuit may occur in a potion of the cell 9 other than the terminals. In the charging device 10 of this embodiment, in the case where the pins are displaced with respect to the cell 9, the positive electrode terminal voltage measuring pin 13 and the negative electrode terminal voltage measuring pin 14 are respectively detached from the positive electrode terminal 91 and the negative electrode terminal 92 ahead of the positive electrode terminal conductive pin 11 and the negative electrode terminal conductive pin 12. Accordingly, the energization is stopped at a time point that the voltage can no longer be measured. In this way, the short circuits of the positive electrode terminal conductive pin 11 and the negative electrode terminal conductive pin 12 can be prevented.

Referring back to FIG. 1 and FIG. 2, a configuration of the charging device 10 will be described. The first power source 3 and the second power source 4 are power sources for applying the voltage to the cell 9. The voltage of the second power source 4 is lower than the voltage of the first power source 3. The charging device 10 functions as a charging device for serial charging and a charging device for parallel charging. The first power source 3 is used as a serial charging power source, and the second power source 4 is used as a parallel charging power source.

The circuit switching section 6 switches wires that are connected to the positive electrode terminal conductive pins 11 and the negative electrode terminal conductive pins 12 of the plural cells 9. The circuit switching section 6 can switch between serial connection and parallel connection of the plural cells 9.

The power source switching section 5 switches connection of the first power source 3 and the second power source 4 to the circuit switching section 6. The power source connected to the circuit switching section 6 is connected to the plural cells 9. In conjunction with switching between the serial connection and the parallel connection of the plural cells 9, it is possible to switch between the power sources with the different voltages.

The voltage measuring section 7 measures the voltage between the positive electrode terminal voltage measuring pin 13 and the negative electrode terminal voltage measuring pin 14, that is, the voltage of the cell 9. When the voltage difference among the plural cells 9 is large, the positive electrode terminal conductive pin 11 and the negative electrode terminal conductive pin 12 can be prohibited from contacting the positive electrode terminal 91 and the negative electrode terminal 92, respectively.

By using FIG. 8, a description will be made on a charging method of a secondary battery by using the charging device 10 according to this embodiment. In the charging method of this embodiment, the plural cells 9 are charged in a state of being set in the jig 16. In the charging method of this embodiment, the plural cells 9 are connected in series and are subjected to constant current charging. Then, the plural cells 9 are switched to the parallel connection and are subjected to constant voltage charging.

As shown in FIG. 8, first, the circuit switching section 6 connects the plural cells 9 in series, and the power source switching section 5 connects the first power source 3 to the plural cells 9 (ST401). That is, the jig 16, on which the plural cells 9 are set, is attached to the charging device 10, and the positive electrode terminal conductive pin 11 and the negative electrode terminal conductive pin 12 are respectively brought into contact with the positive electrode terminal 91 and the negative electrode terminal 92 of each of the plural cells 9, which are connected in series, by the circuit switching section 6. At this time, the power source switching section 5 selects the first power source 3.

Next, the plural cells 9 are charged at a constant current by the first power source 3 (ST402). The constant current charging is conducted while the voltages and the currents of the plural cells 9 are monitored by the voltage measuring section 7.

Next, once at least one of the plural cells 9 reaches a specified reference voltage, the first power source 3 stops the constant current charging, and the voltage measuring section 7 measures the voltages of all of the plural cells 9 (ST403). This is done to prevent the voltage of the cell 9 from becoming higher than the reference voltage.

Next, the circuit switching section 6 determines whether a measured voltage difference among the plural cells 9 is smaller than a specified value (ST404). If it is determined that the measured voltage difference among the plural cells 9 is smaller than the specified value (ST404 YES), the circuit switching section 6 connects the plural cells 9 in parallel, and the power source switching section 5 connects the second power source 4 to the plural cells 9 (ST405). If it is determined that the measured voltage difference among the plural cells 9 is at least equal to the specified value (ST404 NO), the circuit switching section 6 disconnects the cell 9 with a high voltage or the cell 9 with a low voltage such that the voltage difference among the plural cells 9 becomes smaller than the specified value (ST407).

In the case where the plural cells 9 are connected in parallel when the voltage difference among the plural cells 9 is present, the current flows therethrough in a manner to reduce the voltage difference among the plural cells 9, and the voltages of the plural cells 9 are leveled. Accordingly, when the plural cells 9 are connected in parallel, it is possible to prevent a large current from flowing through the cells 9 by reducing the voltage difference among the plural cells 9.

After the plural cells 9 are connected in parallel and the voltages thereof are leveled, the plural cells 9 are charged at a constant voltage by the second power source 4 (ST406). The voltage of the second power source 4 is lower than the voltage of the first power source 3.

According to the charging method according to this embodiment, the constant current charging in the serial connection and the constant voltage charging in the parallel connection can be conducted by using the different power sources. In this way, accuracy of a voltage value in the constant voltage charging can be improved.

In the case where a voltage of a single power source is changed and charging is conducted by using two types of the voltage, accuracy of the voltage in the constant voltage charging is decreased. On the contrary, in the charging method according to this embodiment, the constant voltage charging is conducted by using the second power source 4, which differs from the first power source 3 for the constant current charging. Thus, the accuracy of the voltage value in the constant voltage charging can be improved.

Furthermore, according to the charging method according to this embodiment, the voltage of the each cell is measured before the plural cells are connected in parallel. Then, in the case where the measured voltage difference among the plural cells is smaller than the specified value, the plural cells are connected in parallel. In this way, it is possible to prevent the large current from flowing through the cells when the plural cells are connected in parallel.

EXAMPLE

Figure 11:
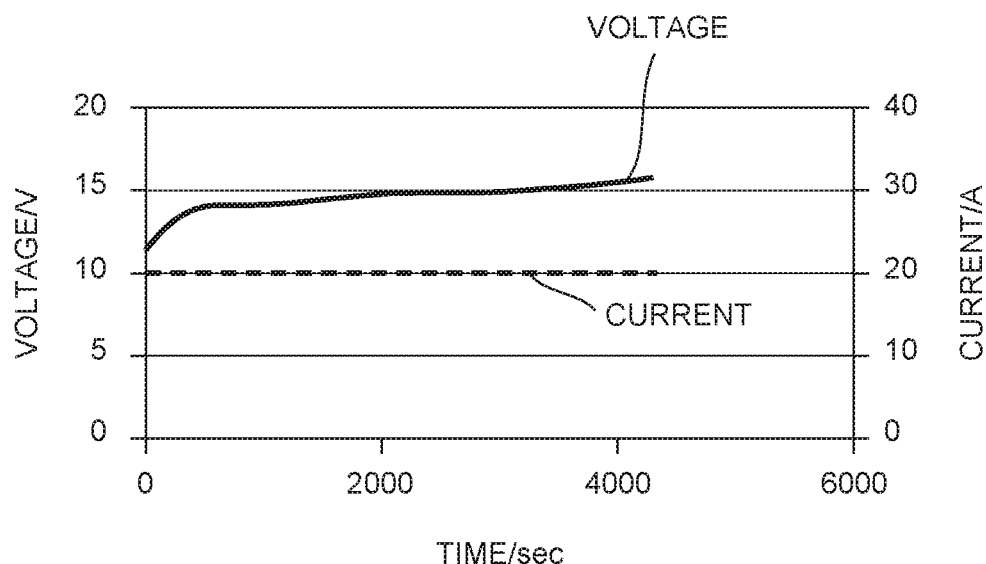
FIG. 11 is a chart of a relationship between time and a voltage when serial constant current charging was conducted in the example.

An example in which the four cells 9 (No. 1 to No. 4) were charged by using the charging device 10 according to this embodiment will be described. As shown in FIG. 9, the four cells 9 were connected in series and were subjected to the constant current charging by the first power source 3. FIG. 11 is a chart of a relationship between time and the voltage when the serial constant current charging was conducted. In FIG. 11, when one of the plural cells 9 reached the specified reference voltage, the constant current charging was stopped. Thereafter, the voltage difference among the plural cells 9 was measured, and it was determined that the voltage difference among the four cells 9 is smaller than the specified value.

Figure 10:
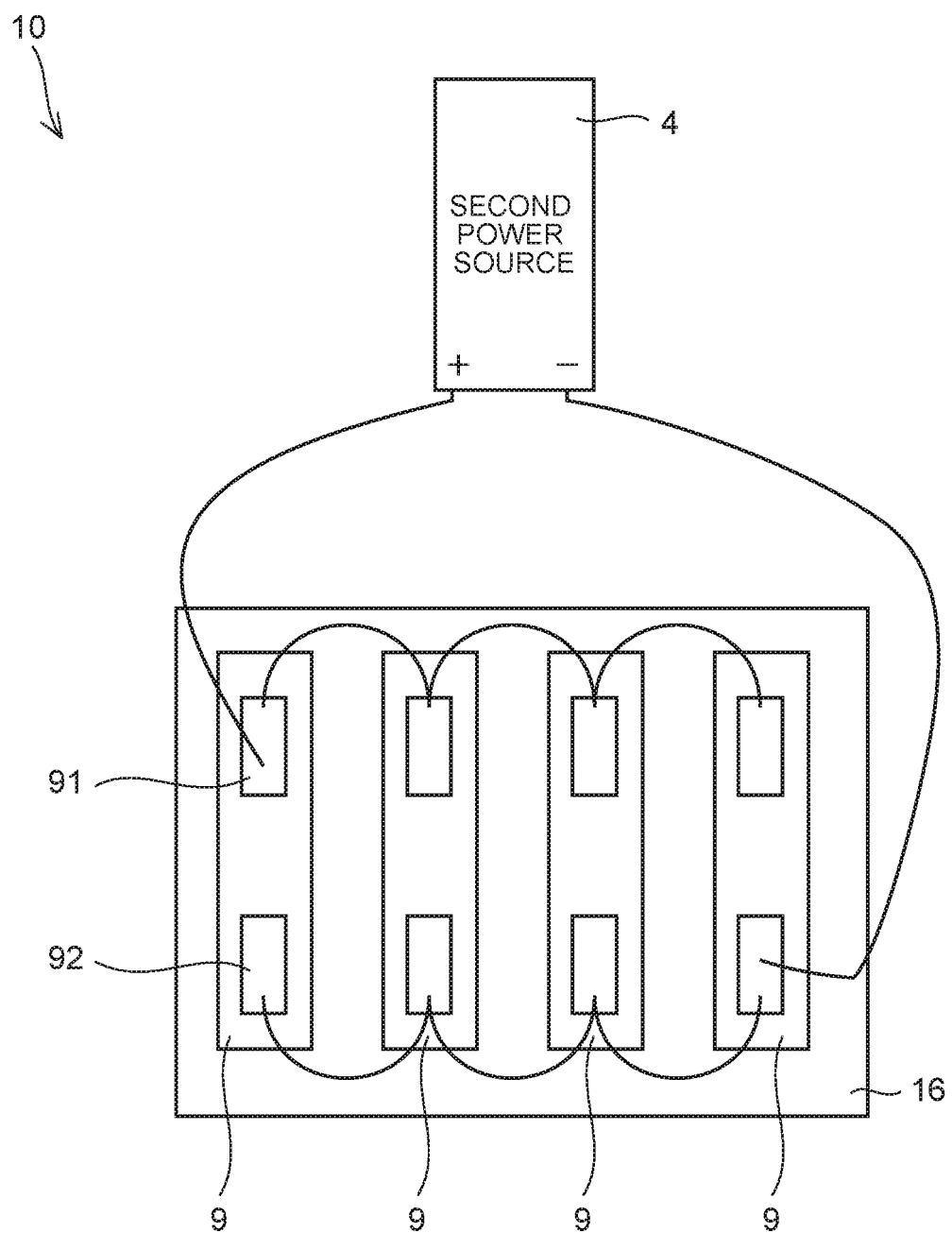
FIG. 10 is a schematic view of a state where the four cells are connected in parallel in the example.
Figure 12:
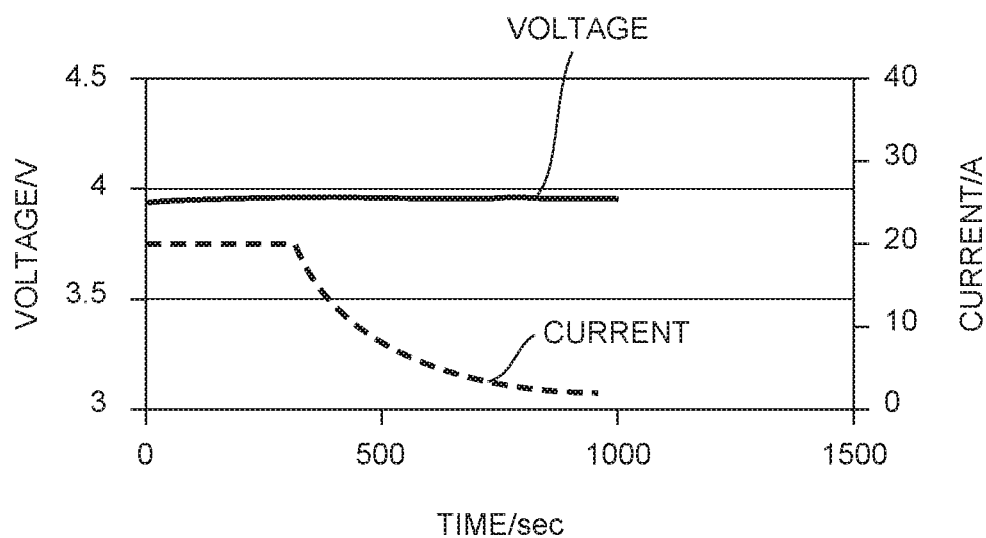
FIG. 12 is a chart of a relationship between the time and the voltage when parallel constant voltage charging was conducted in the example.

After one of the cells 9 reached the reference voltage, as shown in FIG. 10, the cells 9 were connected in parallel and were subjected to the constant voltage charging by the second power source 4. FIG. 12 is a chart of a relationship between the time and the voltage when the parallel constant voltage charging was conducted. When the plural cells 9 are connected in parallel, the voltages of the plural cells 9 are leveled, and the voltage becomes lower than the reference voltage. Accordingly, as shown in FIG. 12, the constant current charging was conducted until the voltage reached the reference voltage in an initial stage of the charging. Then, the constant current charging was switched to the constant voltage charging.

Comparative Example

Figure 13:
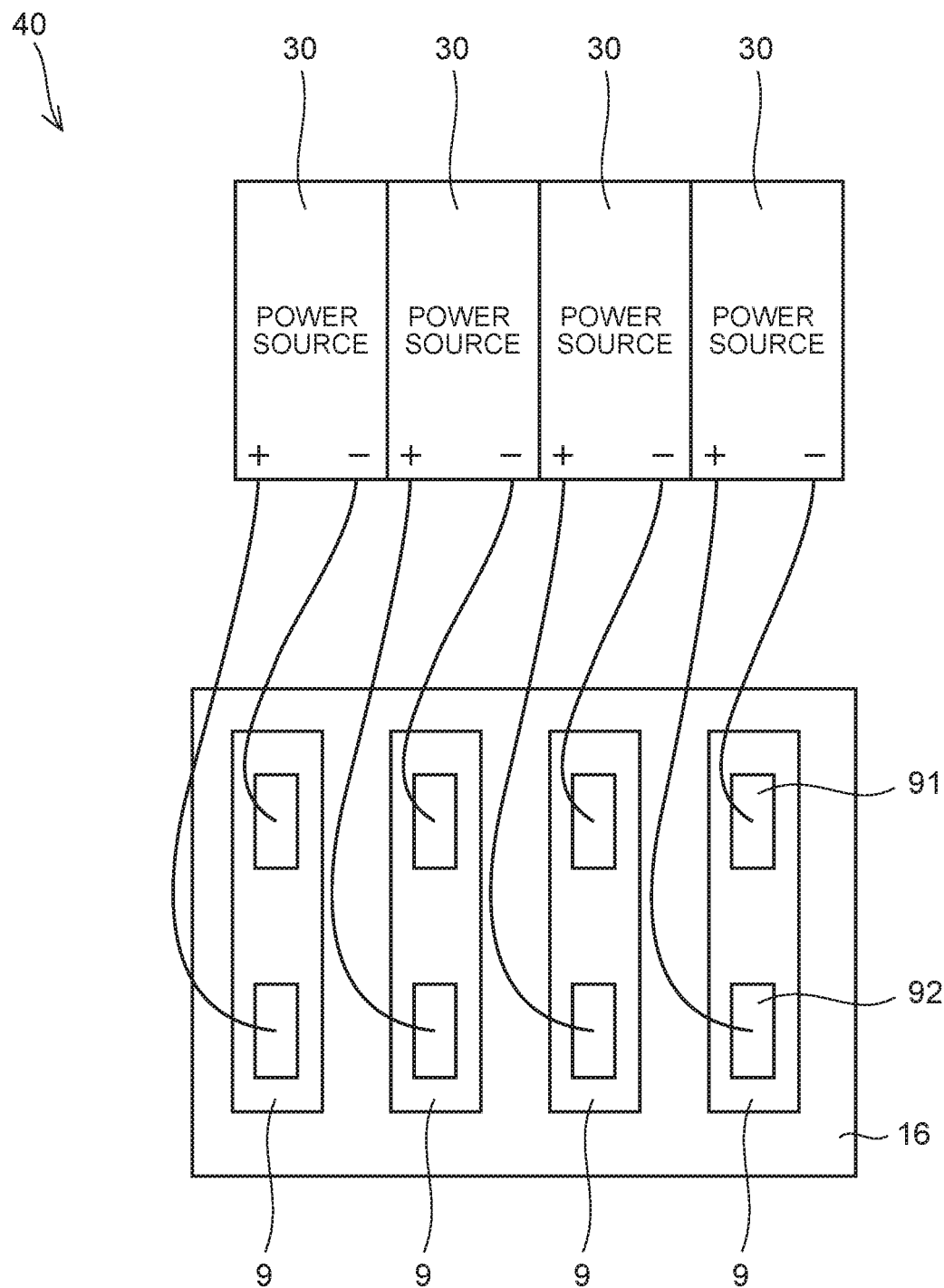
FIG. 13 is a schematic view of a state where the four cells are each connected to a power source in a comparative example.
Figure 14:
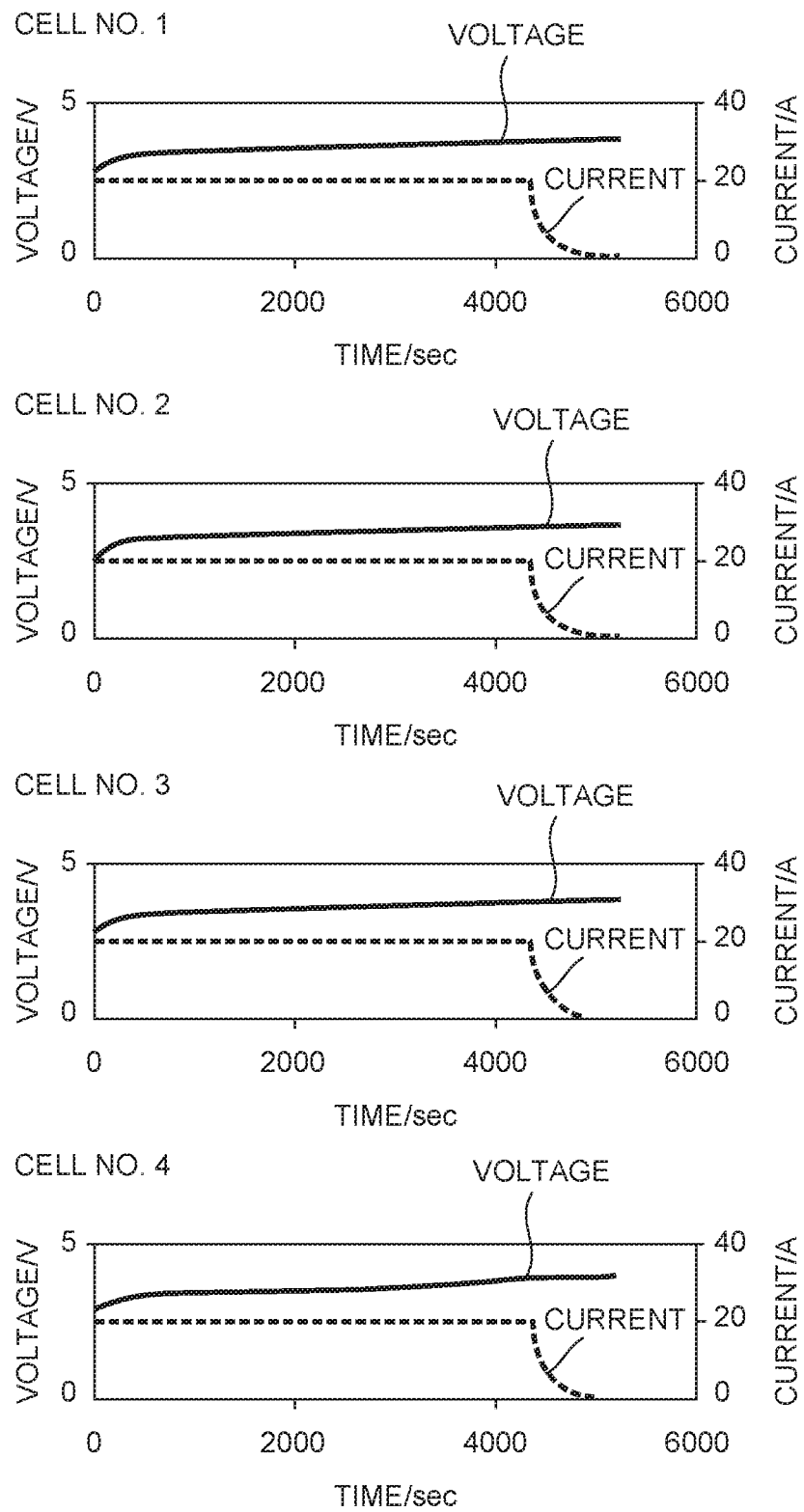
FIG. 14 includes charts of relationships between time and a voltage when constant current charging and constant voltage charging were conducted in the comparative example.

A comparative example in which the four cells 9 (No. 1 to No. 4) were charged by using a charging device 40 that is shown in FIG. 13 will be described. As shown in FIG. 13, the one cell 9 was connected to one power source, and the constant current charging and the constant current charging were conducted. FIG. 14 includes a chart of a relationship between the time and the voltage for the each cell 9 when the cell 9 was charged. As shown in FIG. 14, the constant current charging was conducted until the voltage reached the specified value. Then, the constant current charging was switched to the constant voltage charging.

Comparison between Example and Comparative Example

For each of the charging devices according to the example and the comparative example, a relationship between time and an amount of the power (power source Wh), which were required for charging, is shown in Table 1. In Table 1, a unit of the time required for charging is [second], and a unit of the amount of the power required for charging is [Wh].

In the constant current charging of the example, a power source voltage of the first power source 3 was 20 V, and a power source current thereof was 20 A. In the constant voltage charging of the example, a power source voltage of the second power source 4 was 5 V, and a power source current thereof was 20 A. In the constant current charging of the comparative example, a power source voltage of a power source 30 was 20 V, and a power source current thereof was 20 A.

In the example, the number of the power sources that are simultaneously connected during charging is 1. Thus, the number of channels (the number of ch) is 1. In the comparative example, the number of the power sources that are simultaneously connected during charging is 4. Thus, the number of channels (the number of ch) is 4.

As shown in Table 1, despite a fact that the number of channels is smaller in the example than in the comparative example, the same number of the cells 9 could be charged within almost the same duration of time and at almost the same amount of the electric power. The number of channels is smaller in the example than in the comparative example, that is, the number of the power sources that are simultaneously connected is smaller in the example than in the comparative example. Thus, charging can be conducted at lower cost by the charging device 10 according to the example than by the charging device 40 according to the comparative example.

It should be noted that the invention is not limited to the above embodiment and can appropriately be modified within the scope that does not depart from the gist thereof.

What is claimed is:
1. A charging device comprising:
a positive electrode terminal conductive pin that is connected to a positive electrode terminal of a cell and supplies electric power to the cell;
a positive electrode terminal voltage measuring pin that is connected to the positive electrode terminal of the cell and measures a voltage of the cell;
a negative electrode terminal conductive pin that is connected to a negative electrode terminal of the cell, is paired with the positive electrode terminal conductive pin, and supplies the electric power to the cell; and
a negative electrode terminal voltage measuring pin that is connected to the negative electrode terminal of the cell, is paired with the positive electrode terminal voltage measuring pin, and measures the voltage of the cell,
wherein a tip position of the positive electrode terminal voltage measuring pin is closer to the positive electrode terminal than that of the positive electrode terminal conductive pin, and a tip position of negative electrode terminal voltage measuring pin is closer to the negative electrode terminal than that of the negative electrode terminal conductive pin, and

TABLE 1

| | Constant Current | | | | | Constant Voltage | | | | | Total | | | |
|---|---|---|---|---|---|---|---|---|---|---|---|---|---|---|
| | Power Source Voltage | Power Source Current | Number of ch | Time | Power Source Wh | Power Source Voltage | Power Source Current | Number of ch | Time | Power Source Wh | Number of ch | Time | Power Source Wh | Cost |
| Comparative Example | 5 | 20 | 4 | 4403 | 489 | 5 | 20 | 4 | 812 | 90 | 8 | 5215 | 579 | High |
| Example | 20 | 20 | 1 | 4246 | 472 | 5 | 20 | 1 | 986 | 27 | 2 | 5232 | 499 | Low | wherein tips of the positive electrode terminal voltage measuring pin and the negative electrode terminal voltage measuring pin are retractable when respectively abutting against the positive electrode terminal and the negative electrode terminal.

2. The charging device according to claim 1, wherein, on a terminal surface of the cell, on which the positive electrode terminal and the negative electrode terminal are arranged, the positive electrode terminal conductive pin is positioned in a vicinity of a center of the positive electrode terminal, the negative electrode terminal conductive pin is positioned in a vicinity of a center of the negative electrode terminal, the positive electrode terminal voltage measuring pin is positioned on an outer side of the positive electrode terminal conductive pin when seen from a middle point between the positive electrode terminal conductive pin and the negative electrode terminal conductive pin, and the negative electrode terminal voltage measuring pin is positioned on an outer side of the negative electrode terminal conductive pin when seen from the middle point.

* * * * *